Aug. 25, 1936.    H. G. THOMSON    2,052,324
ART OF CERAMIC KILNING AND MAKING BUILDING UNITS
Filed Feb. 25, 1933
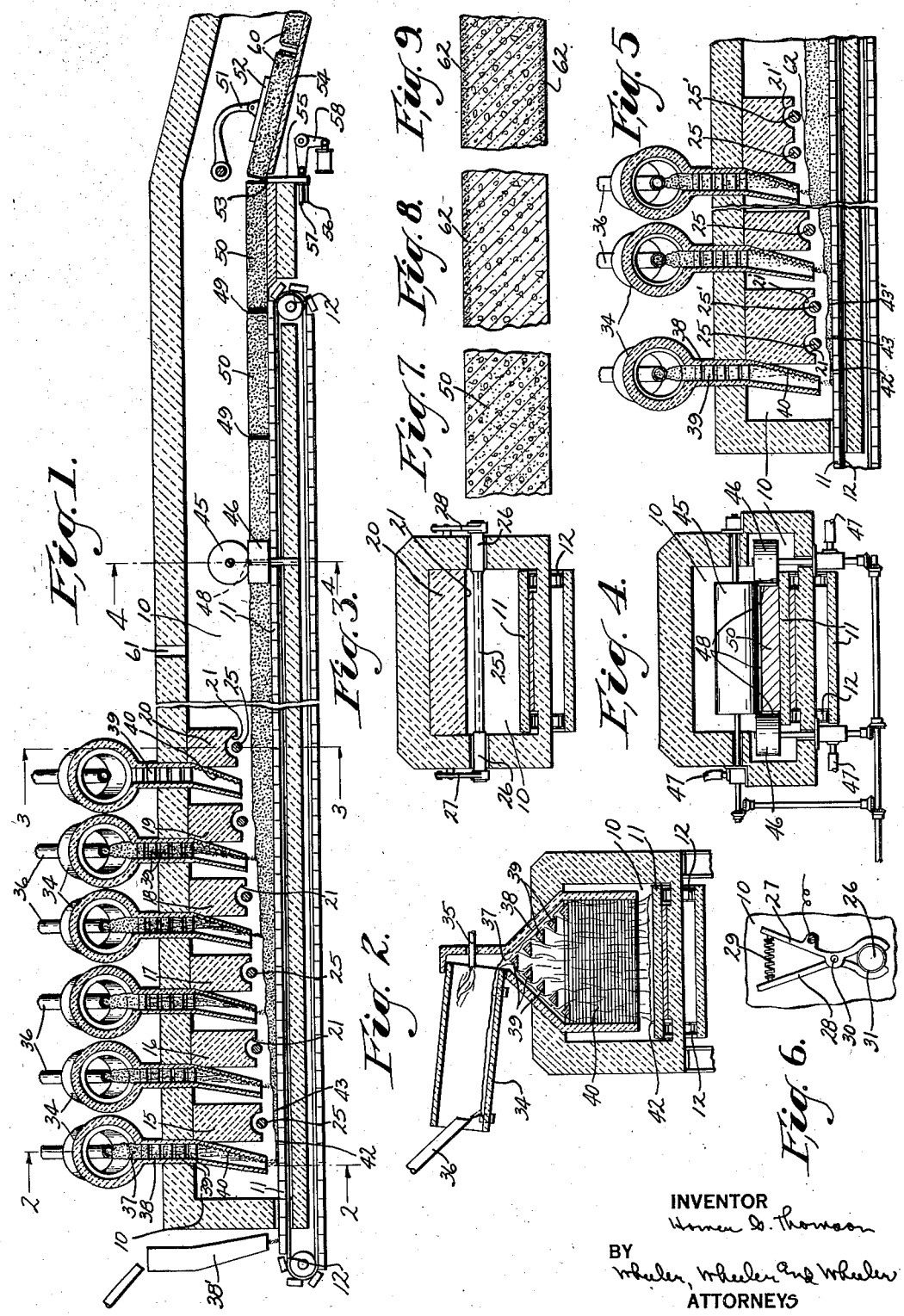
INVENTOR
Homer G. Thomson
BY
Wheeler, Wheeler and Wheeler
ATTORNEYS Patented Aug. 25, 1936

2,052,324

UNITED STATES PATENT OFFICE 2,052,324

ART OF CERAMIC KILNING AND MAKING BUILDING UNITS

Homer G. Thomson, Milwaukee, Wis.

Application February 25, 1933, Serial No. 658,474

12 Claims. (Cl. 25—142)

This invention relates to improvements in the art of ceramic kilning, and making building units.

It is the object of the invention to provide a novel apparatus, method, and product, whereby I am enabled to produce ceramic blocks or units economically, dependably, and quickly, for building and other purposes. It is my further purpose to provide for the complete control of the process whereby a cellular structure may be made open and porous throughout, or may take the form of individually closed cells as desired, and may optionally be substantially non-porous either at its bottom face or its top face or at any desired level therebetween.

More specifically stated, it is the purpose of the present invention to provide means by which a mass of ceramic material may be built up and burned on a moving hearth in such a way that each successive increment upon the mass may be individually kilned to correspond to all other increments of the mass so that the resulting product will be homogeneous throughout and so that each increment of clay may, if desired, receive special heat treatment, as for the elimination of gas from the material at certain levels as above suggested.

It is a further important object to provide for the manufacture of ceramic sheets in a continuous process, facilitated, in the use of clay or the like, by the arrangement for the controlled, separate heat treatment of successive increments.

In the drawing:

Figure 1 is a diagrammatic longitudinal section through a kiln embodying the invention.

Figure 2 is a detail view taken in transverse section on the line indicated at 2—2 in Figure 1.

Figure 3 is a detail in transverse section taken in the plane indicated at 3—3 in Figure 1.

Figure 4 is a detail view taken in transverse section in the plane indicated at 4—4 in Figure 1.

Figure 5 is a fragmentary detail view similar to Figure 1 but illustrating a slightly modified construction of the kiln.

Figure 6 is an enlarged fragmentary detail view showing in side elevation the mounting of the heating bars employed in the kiln herein disclosed.

Figure 7 is a fragmentary view in enlarged cross section showing diagrammatically the normal product of the kiln illustrated in Figure 1.

Figures 8 and 9 are devices similar to Figure 7 illustrating diagrammatically the variation possible in the operation of the kiln shown in Figure 5.

Like parts are identified by the same reference characters throughout the several views.

The invention is particularly adapted for use in connection with the red burning shale which is found in central Illinois and various other parts of the country. It has long been known to ceramic experts that articles made from this and other like clays, might be damaged by bloating if kilned under conditions such that bloating might occur. This clay contains particles of carbon and also contains iron. In a reducing atmosphere carbon monoxide and carbon dioxide are given off and the resulting gas bubbles bloat the clay.

It has been difficult to employ this phenomenon commercially because of the fact that in any considerable mass of clay sufficiently large to be used for bricks or building blocks, the whole mass cannot be raised uniformly and speedily to identical temperatures. The range of temperatures at which bloating is produced is only about 200°, usually falling between 1900° and 2200° F., depending on the particular clay. Below the proper temperature range the desired reaction will not occur to produce the gas bubbles. Above this temperature the clay becomes sufficiently soft so that the gas bubbles escape and the surface of the block is vitrified and non-porous.

Throughout the range at which bloating occurs the specific character of the bloat will vary according to the temperature. In the lower part of the range, the bloat will produce an open, porous product. In the upper part of the range, the decreased viscosity of the clay will result in the formation of closed cells. Thus, in the treatment of any large mass of clay the gas bubbles may have entirely escaped from the surface before the center portion of the mass reaches bloating temperatures. As the outside may be cellular and the inside porous, or even unbloated, this is true even where the shale employed has a low lime content and is thus provided with a maximum viscosity range to hold the gaseous bubble.

In the present invention the material is heated almost entirely by radiated heat, thus enabling the temperature to be more adequately controlled than has heretofore been possible. The heat is conveniently developed electrically in high resistance bars beneath which the clay moves slowly. Like treatment of all parts of the mass is assured by the very important feature of delivering the material to the moving hearth in successive increments or deposits which are sufficiently thin so that the heat from a single heating unit will almost immediately penetrate each successive deposited increment in the course of its continuous passage thereunder.

Referring now to the drawing, I have shown at 10 a kiln through which moves any conventional type of movable hearth 11 (here illustrated in the form of a pair of endless conveyors 12 carrying refractory hearth blocks and movable through the forward portion of the kiln.

Spaced at intervals in the forward portion of the kiln from front to rear thereof, are the reflectors 15, 16, 17, 18, 19 and 20. Each reflector is in the form of a bridge wall of refractory material having in its under side a semi-cylindrical reflecting surface 21. The reflecting surfaces are preferably disposed at progressively increasing distances from the path of the movable hearth throughout the series of reflectors, the increase being so calculated as to maintain a substantially constant spacing of only a few inches between the reflectors and the material on the hearth.

Centered in each one of the channel shaped reflecting surfaces, is a high temperature electrical resistance element 25. This element preferably comprises a cylindrical bar having its cross section so determined with reference to its resistance to the current passing through it, as to operate at a temperature in the neighborhood of 2900° F. This bar extends from one side of the kiln to the other, as shown in Fig. 3, and at its ends is provided with heads 26 of enlarged diameter which, because of their greater cross section, are so decreased in resistance that they carry the current without heating to the point where they cannot be handled.

At the exterior of the kiln there are contacts which engage the heads 26, preferably in the manner shown in Fig. 6. The preferred type of contact is in the form of a pair of tongs, one arm 27 thereof being fixed and the other arm 28 being yieldably pressed by spring 29 about a fulcrum at 30 into engagement with a piece of foil or other like metal 31 capping the head 26 of the resistance element to facilitate the conduction of current from the tong-like contact to the head 26. It will be understood by those skilled in the art that the temperature at which these bars operate may readily be varied by regulating the current supplied thereto, so that the working temperature may be adapted for any desired kind of material, and may also be adapted to produce any desired effect in any specific stratum or increment.

Associated with each one of the heating elements and its reflector, is a means for feeding to the moving hearth, before the hearth reaches the particular heating element, an increment of pulverulent material well distributed over the hearth, or the mass of material previously deposited upon the hearth. In the case of clay such material should be preheated. In Figs. 1, 2 and 5, the tubular cylinders 34 represent a conventional type of rotary preheater, no means for rotating them being illustrated because the provision of such means is mechanically well known. The interior of each cylinder is heated by a flame from a jet such as is illustrated at 35. The clay is delivered to the preheating cylinder through a spout 36 and, by reason of the inclination of the axis of the cylinder, the clay is caused to pass axially through the cylinder along the bottom thereof, as the cylinder is rotated.

A reducing atmosphere is maintained in each preheater except where it is desired that the clay deposited from any specific preheater shall comprise a non-bloating increment or layer in the product.

The interior of the preheating cylinder is preferably maintained at a temperature of about 1600° F., at which temperature the clay may be maintained in a finely pulverized condition and will flow as readily as sand.

By way of example I have shown a distributing feeder 38 having a series of triangular baffles 39 for subdividing the pulverized material 37 and distributing it substantially uniformly over the gradually increasing width of the feeder 38.

As the subdivided streamlets of material trickle from the edges of the triangular baffles, they pass over a riddle 40 which is transversely ribbed like a washboard and serves to complete the distribution of the material particles uniformly over the entire width of the feeder 38 so that the material from each feeder will be discharged on to the apron hearth in the form of a thin film which, in the movement of the hearth, will build up thereon a layer 42 of substantially uniform width and thickness.

As soon as the first layer of material has been deposited on to the hearth, it passes beneath the first of the heating elements 25. If the material be clay or any other material viscous when heated and containing gasifying chemicals it is caused to bloat, a reducing atmosphere preferably being maintained in the kiln to promote the chemical action which results in bloating as above described. The bloating increases the thickness of the original deposit as shown at 43 in Fig. 1.

Despite the fact that the stratum deposited on the hearth is extremely thin, if its surface were allowed to remain at the heat developed in it by its direct exposure to the heating element 25, a certain amount of over-fluidity would result if it were not for the fact that the radiated heat affects only a narrow zone from which the material is immediately moved, and the further fact that there is almost immediately deposited on the surface of the originally bloated layer 43 a further film of material from the second preheater and feeder.

This material, assuming it to be preheated clay at a temperature of only 1600°, deprives the previously bloated material of all of the heat which would otherwise be imparted thereto by the second heating element and, as a result, the second layer or increment of clay is bloated exactly like the first. As soon as it is bloated it is immediately covered by a third increment of clay, which passes beneath the third heating element to be bloated in its turn. Thus, by successive increments, of such thickness that each increment can be almost instantaneously heated as a unit, the deposit is built up to any desired depth and is characterized by a substantial homogeneity throughout its mass.

The fact that the material is heated almost entirely by radiation contributes very materially to the desired result. Of course the entire interior of the kiln is hot, but it contains relatively little heat except such as is derived from the cooling of the material between the zones in which the material is raised to bloating temperatures by radiation from the heating bars. Bloating is accomplished almost exclusively in the areas of intense heat immediately beneath the successive heating elements and reflectors. The fact that heating is accomplished by radiation limits the area of the high heat zone, and the intermediate cooler areas prevent the surface of the material from reaching the temperature at which it might become unduly molten and fluid and release gas. As above noted, the successive deposits of fresh material also prevent over-fluidity.

It will be noted in Fig. 1, that the final preheater and feeder are not shown to be functioning, nor is the final heating element 25 in operation. It is possible to have any desired number of preheaters, feeders and heating elements in reserve so that the thickness of the mass may be increased when desired, and so that if any one heating element should become burned out, one of the reserve units could be added to the system without interrupting the continuity of the process.

The mass deposited on the apron hearth will have a surprisingly uniform thickness and lateral extent. It is, however, possible to square the surfaces of the mass while the clay remains plastic. This may be done either by reciprocatory pressing devices or by rollers, care being taken in either case not to compress the mass unduly and thereby to destroy its highly porous or cellular characteristic resulting from the bloating operation.

By way of illustration I have shown a top roller 45 and side rollers 46 which are suitably driven to act on the material as it is fed by the conveyor system between the rolls. The rolls are preferably cooled, being supplied with a cooling fluid through pipes 47 adapted for the purpose. An undue degree of cooling will cause the material to crack, but presses for this general purpose are known and the temperatures at which the presses may operate are also known. The feature of the present press lies in the fact that it functions continuously, thereby being adapted for use in conjunction with the continuous process herein disclosed.

The driving connections for the press rolls 45 and 46 are preferably intergeared as shown in Fig. 4 so that the rolls turn in unison. Such synchronism of movement makes it possible to provide the several rollers with mating ribs 48 which groove the material as shown at 49 in Fig. 1, to facilitate its subsequent breaking into blocks of uniform size.

The particular character of the sheet at 50 will depend upon the exact temperature to which the material has been heated in its passage beneath the successive heating elements. As above stated, there is only a range of about 200 degrees F. in which successful bloating of clay may be accomplished. In the lower portion of this range of temperatures the clay will have an open porous structure, particularly suitable for acoustical treatment, inasmuch as the open pores are well adapted to absorb sound waves by carrying them into the spongy porous interior of the block and dissipating their energy. In the upper portion of the 200° range the clay will be particularly suitable for exterior use where thermal insulation is required, as the porous structure will take the form of closed cells.

Any desired means may be employed for separating the continuous sheet into blocks. The scoring 49 performed by the rolls 45 and 46 facilitates a breaking operation which is particularly suited to the continuous process herein disclosed. While the sheet may readily be cut into blocks if desired, very satisfactory results may be obtained through the use of an arm 51 and a presser plate 52 synchronized with the movement of the sheet to press each succeeding section downwardly about the apex 53 at which the sheet is forced to change its direction due to the inclination of the bottom portion 54 of the kiln.

The breaking is greatly facilitated if the apex 53 comprises a reciprocable member 55 highly cooled by fluid carried to it through the supply and return lines 56 and 57, the reciprocating member being operated by a bell crank 58 in synchronism with the movement of the sheet. The chilled member 55 rises abruptly to contact the mass in registry with the score lines 49 therein, and the sheet will immediately crack, thus minimizing the need for the pressure arm 51 and plate 52 in separating the block 60.

The rear end of the kiln serves as an annealing or tempering oven in which the blocks are gradually cooled. Cooling gases are vented at duct 61.

For special purposes it may be desired entirely to vitrify either the top or bottom surface of the mass. This may readily be done either by increasing the temperature of the heating element or by oxidizing in the preheater, or, as is more practicable, providing an additional element where complete vitrification is desired. In Fig. 5 I have shown the first and last heating elements 25 supplemented by additional elements 25', each of which has its own reflecting surface 21'. The material initially deposited at 42 is bloated at 43 but, due to the extra heat radiated by the heating element 25', the material becomes so hot that its consequent fluidity results in the escape of the gas and the partial collapse of the bloated material, as shown at 43'.

The successive operations exemplified by the second feeder and resistance element shown in Fig. 5, may be carried on as above described but in the final operation another extra heating element is employed with the result that the top surface is also non-porous as shown at 62.

Figs. 8 and 9 show diagrammatically the elimination of gas bubbles from one surface by the operation of a single extra bar in Fig. 8, and the elimination of gas bubbles from both the top and bottom surfaces, as shown in Fig. 9, by the operation of both the extra heating bars, as shown in Fig. 5.

Any of the heating elements may be operated at temperatures different from the others to produce special effects in particular strata, whereby the character of the product is always under complete control.

Obviously, where the material is to be softened to the point of becoming viscous, it is extremely important to take steps to prevent over-adhesion to the hearth. In all the processes herein disclosed, however, it is preferred in any event to deposit a fine layer of sand or other suitable material on the hearth to keep the material from adhering thereto. At 38' in Fig. 1 I have illustrated a sanding device which may correspond identically to the feeder shown at 38, with the exception that the sand need not be preheated.

Those skilled in the art will recognize from the foregoing description of my improved apparatus, process and product, that I have achieved the objectives of this invention. The apparatus is simple and relatively inexpensive to build and operate. The continuity of the process and the fact that it is entirely automatic, effects great economies. The successive heat treatment of successively deposited increments of material is a very important contribution to the success of the process and the acceptability of the product.

The product represents the first instance in which it has been possible to control bloating either to produce a homogeneous mass of material in which the bloating is uniform throughout, or to vary the nature of the bloating to produce a predetermined open or closed porous or cellular result, or to produce a material which has one or more gas free layers between which the bloating is such that the material is homogeneous.

The complete block made in accordance with this invention is widely adaptable for building purposes. If the gas bubbles form cells, as distinguished from pores, or if one surface is completely vitrified, the block will be entirely water and weather proof. If one surface is open and porous, the block will be particularly desirable from an acoustical standpoint. The material is so light that large units of blocks may be handled by a mason without difficulty.

It will be understood by those skilled in the ceramic art that although clay has been referred to specifically in the foregoing description by way of exemplifying the application of the invention, there are many features of the invention which are useful in connection with other ceramic products, particular reference being made to the building up of heat treated units including diatomaceous earth, magnesia, and various refractory and non-refractory compounds, some of which may contain chemicals adapted to react in the presence of heat to release gas for the bloating of the product.

It will also be understood that certain features of this invention are applicable outside of the ceramic arts wherever it is desired to build up a sheet or mass of material through the successive heat treatment of individual increments thereof.

I claim:

1. The combination with a kiln, of a movable hearth operating through a portion thereof, a series of transversely channelled reflecting surfaces spaced along the path of movement of said hearth at successively increasing heights thereabove, heaters operatively associated with the respective reflectors for the radiation of their heat toward said hearth and materials carried thereby, a series of preheaters, and a distributing feeder leading from each preheater toward said hearth and including means for delivering preheated material in a thin film throughout a predetermined area of said hearth, one of said feeders being placed immediately before each heater whereby successive increments of material upon said hearth will be successively exposed to like conditions of heat.

2. In a continuous block making machine, the combination with a conveyor, means for depositing material thereon, and means for applying to such material sufficient heat to render it cohesive in a ribbon upon said conveyor, of a surface arranged to receive the ribbon of material from the conveyor, means for chilling the material while hot solely upon given lines longitudinally spaced, whereby to tend to cause it to crack, and means for maintaining said chilling means at a temperature substantially below that of said material.

3. In a block forming apparatus, the combination with a conveyor, means for depositing material continuously thereon, and means for rendering said material plastically cohesive, of means for scoring the plastic material before it hardens, and means for breaking from the material the successive end portions thereof demarcated by the score lines therein.

4. A process of the character described, comprising the delivery of preheated bloatable material in successive increments upon each other at temperatures insufficiently high to cause bloating and the exposure of each successive increment for a brief period to a temperature sufficiently high to cause the several increments to bloat under substantially like conditions, whereby to produce a bloated mass substantially homogeneous throughout.

5. A process of the character described, including the deposit of a shallow layer of preheated bloatable material, the momentary exposure of the deposited layer to radiated heat of sufficient temperature to bloat said layer, the immediate deposit upon the bloated layer of a fresh increment of preheated material, and the immediate brief exposure of said increment to bloating temperatures, whereby to provide an integral bloated mass.

6. A process of the character described, including the bloating of an increment of material, raising the temperature of said increment beyond the bloating point whereby to liquefy said increment, the deposit upon the vitrified increment of successive increments, and the independent heat treatment of each increment at bloating temperatures, whereby to produce a bloated mass having a vitreous and relatively non-porous surface.

7. In a process of the character described, the treatment of successive increments of material containing gas producing chemicals separately to bloating temperatures to produce an integral bloated mass, and the subsequent treatment of the surface of said mass at gas freeing temperatures.

8. A process of the character described, including the continuous deposit of successive increments of material containing gas producing chemicals and the individual heat treatment of the respective increments, the treatment of a plurality of said increments being conducted at bloating temperatures and the treatment of one of said increments being conducted at a gas freeing temperature.

9. The process of building up a mass of material differing in predetermined strata as to its solid or cellular structure, which method consists in the individual deposit and separate heat treatment of successive increments of said material and the manipulation of one such increment to render it gas free.

10. In apparatus of the character described, the combination with a movable hearth, of a set of high temperature heaters disposed above the path of movement of said hearth and provided with means limiting the effect of said heaters to short mutually spaced zones of travel along the path of movement of said hearth, and means between said heaters and the zones of high temperature effect thereof for delivering to said hearth and to material previously deposited thereon fresh increments of material in advance of the respective heaters, each such increment of material being protected from bloating temperatures before it reaches one of said zones.

11. In apparatus of the character described, the combination with a movable hearth, of a set of radiant heat generating bars disposed transversely across and above the path of movement of said hearth at successively increasing levels, means limiting the zone of high temperature heat from said bars to mutually spaced areas along said path, and means sufficiently remote from each such bar to be protected from bloating temperatures for distributing successive increments of material on said hearth and the material previously deposited thereon between the zones of high temperature influence of said bars.

12. A process of the character described comprising the depositing of an increment of bloatable material at temperatures insufficiently high to cause bloating, the momentary exposure of said increment of material to a limited zone of radiant heat at temperatures sufficient to bloat said increment, the removal of said increment from the zone of bloating temperatures to a zone of temperature insufficient to cause bloating, the deposit of a successive increment of material upon the bloating increment at sub-bloating temperatures, the exposure of the second increment of material to a like limited zone of radiant heat at bloating temperatures, and the removal of said increments from said last mentioned zone, whereby to produce a bloated mass of fused increments substantially homogeneous throughout.

HOMER G. THOMSON.